(12) United States Patent
Park

(10) Patent No.: US 6,205,229 B1
(45) Date of Patent: Mar. 20, 2001

(54) TELEVISION HAVING A DEVICE FOR PREVENTING VIBRATION OF SPEAKER

(75) Inventor: Nam-Gyue Park, Seoul (KR)

(73) Assignee: Daewoo Electronics Co., Ltd., Seoul (KR)

( * ) Notice: Subject to any disclaimer, the term of this patent is extended or adjusted under 35 U.S.C. 154(b) by 0 days.

(21) Appl. No.: 09/079,477

(22) Filed: May 15, 1998

(30) Foreign Application Priority Data

Sep. 26, 1997 (KR) .................................................. 97-49234

(51) Int. Cl.⁷ ...................................................... H04R 25/00
(52) U.S. Cl. .......................... 381/388; 381/306; 381/333; 381/345; 381/354; 181/151; 181/198
(58) Field of Search ..................................... 381/306, 333, 381/345, 354, 386, 387, 388, 399, 408, 431; 181/160, 148, 151, 156, 163, 199; 348/825, 833

(56) References Cited

U.S. PATENT DOCUMENTS

| 4,714,133 | | 12/1987 | Skaggs, Jr. . |
| 5,195,143 | * | 3/1993 | Spiegel et al. ........................ 381/399 |
| 5,274,709 | * | 12/1993 | Koizumi ................. 381/333 |
| 5,452,025 | * | 9/1995 | Koizumi ................. 381/388 |
| 5,629,503 | | 5/1997 | Thomasen . |
| 5,682,021 | | 10/1997 | Jeon et al. . |
| 5,920,637 | * | 7/1999 | Jeon ..................................... 381/388 |

FOREIGN PATENT DOCUMENTS

| 0 392407A2 | 10/1990 | (EP) . |
| 0 392407A3 | 10/1990 | (EP) . |
| 0322514 | 12/1929 | (GB) . |

OTHER PUBLICATIONS

WPI Abstract Accession No. 88–136095 & JP 63077297 A (Matsushita), "Vacuum Cabinet with Diaphragm".

* cited by examiner

*Primary Examiner*—Wing F. Chan
*Assistant Examiner*—Suhan Ni
(74) *Attorney, Agent, or Firm*—Jacobson, Price, Holman & Stern, PLLC

(57) ABSTRACT

The television having a device for preventing vibration of speaker comprises a speaker. The speaker is fixed on one wall toward a hollow portion formed in an enclosure, and an opening for emitting sound is formed on the enclosure. A vibration plate faces the speaker to be positioned in the opening at a predetermined interval from the speaker. And, a mounting means for mounting the vibration plate on the enclosure is provided. Therefore, vibration of speaker emitting medium/low bandwidth sound outside and vibration of cabinet in which the speaker is mounted is minimized so that quality of sound becomes high and sound having high power is emitted outside.

8 Claims, 5 Drawing Sheets

TELEVISION HAVING A DEVICE FOR PREVENTING VIBRATION OF SPEAKER

BACKGROUND OF THE INVENTION

1. Field of the Invention

The present invention relates to a television having a device for preventing vibration of speaker, and more particularly to a television having a device for preventing vibration of speaker which minimizes vibration of speaker emitting medium/low bandwidth sound outside and vibration of a cabinet in which a speaker is mounted to prevent abnormal noise.

2. Description of the Prior Art

Generally, a television is composed of a sound receiving circuit portion consisting of sound receiving circuit for detecting sound signal of air-borne waves and speaker, an image receiving circuit portion for detecting image signal, a chrominance-generating circuit for transforming color signal transmitted to the image receiving circuit portion into original color for operation of a cathode-ray tube, and a synchronizing deflection circuit portion which picks up synchronizing signal of image signal to operate deflecting circuit horizontally/vertically on basis of synchronizing signal to form an image on fluorescent screen of the cathoderay tube. The speaker is installed in the cabinet of the television by a speaker mounting member, so that emits medium bandwidth sound/low bandwidth sound outside with high power.

In the conventional television composed as above, as shown in FIG. 1, the speaker mounting member 113 having a hollow portion is installed in the cabinet 101 of television in which a grill is formed on a front edge. A boss 107 for screw 109 is formed integrally with the speaker mounting member 113 on an upper/lower portion of the speaker mounting member 113, so that the speaker mounting member 113 is fixed to the cabinet 101 by the screw 109. The speaker 111 is attached on the speaker mounting member 113 fixed on the cabinet 101, so that the speaker 111 emits sound outside through the grill 103. Sound emitted from the speaker 111 is transformed into medium/low bandwidth sound through the hollow portion.

However, in the structure as above, when the speaker 111 emits sound, the speaker mounting member 113 mounted in the cabinet 101 vibrates and even the cabinet 101 vibrates too. Accordingly, synthesized sound by mutual resonance of the speaker mounting member 113 and the cabinet 101 causes abnormal noise. Therefore, quality of sound is reduced and sound having high power is not heard.

SUMMARY OF THE INVENTION

Therefore, the present invention has been proposed to overcome the above described problems in the prior art, and accordingly it is an object of the present invention to provide a television having a device for preventing vibration of speaker which minimizes vibration of speaker emitting medium/low bandwidth sound outside and vibration of a cabinet in which a speaker is mounted to prevent abnormal noise.

To achieve the above objects, the present invention provides a television having a device for preventing vibration of speaker comprising a speaker, an enclosure in which the speaker is fixed on one wall toward a hollow portion formed therein and which an opening for emitting sound is formed on, a vibration plate which faces the speaker to be positioned in the opening at a predetermined interval from the speaker, and a mounting means for mounting the vibration plate on the enclosure.

The speaker can be a woofer which generates a low bandwidth sound. The opening of the enclosure can preferably be connected to a grill formed on a front portion of the television. More preferably, a plane in which the speaker is mounted on is perpendicular with a plane in which the opening is formed thereon. The vibration plate can be quadangular-shaped. The mounting means can comprise a vibration magnet installed on edge of the vibration plate, a supporting magnet for supporting one portion of the vibration magnet, and a supporting bracket for fixing the supporting magnet on the enclosure. The supporting magnet can have a C-shaped sectional plane for containing the vibration magnet. Also, the supporting magnet has polarities facing polarities of the vibration magnet so that a pushing force is activated mutually between the supporting magnet and the vibration magnet. The supporting magnet can be installed at four positions around the vibration plate.

Also, television having a device for preventing vibration of speaker in the present invention comprises a speaker, an enclosure in which the speaker is fixed on one wall toward a hollow portion formed therein and in which an opening for emitting sound and being connected to a grill formed on a front portion of the television is formed on the other wall, a quadrangular-shaped vibration plate which faces the speaker to be positioned in the opening in a predetermined interval from the speaker, and a mounting means for mounting the vibration plate on the enclosure, wherein the mounting means comprises a vibration magnet installed on an edge of the vibration plate, a supporting magnet for supporting one portion of the vibration magnet, and a supporting bracket for fixing the supporting magnet in the enclosure.

Here, the speaker can be a woofer which generates low bandwidth sound. Preferably, a plane which the speaker is mounted on is perpendicular with a plane in which the opening is formed thereon. The supporting magnet can have a C-shaped sectional plane for containing the vibration magnet. The supporting magnet can have polarities facing polarities of the vibration magnet so that a pushing force is activated mutually between the supporting magnet and the vibration magnet. The supporting magnet can be installed at four positions around the vibration plate.

Therefore, vibration of speaker emitting medium/low bandwidth sound outside and vibration of cabinet which speaker is mounted thereon is minimized so that quality of sound becomes high and sound having high power is emitted outside.

BRIEF DESCRIPTION OF THE DRAWINGS

The above objects and other advantages of the present invention will become more apparent by describing in detail preferred embodiment thereof with reference to the attached drawings in which.

DETAILED DESCRIPTION OF THE PREFERRED EMBODIMENTS

Embodiments of the present invention will now be described below with reference to the figures.

Figure 1:
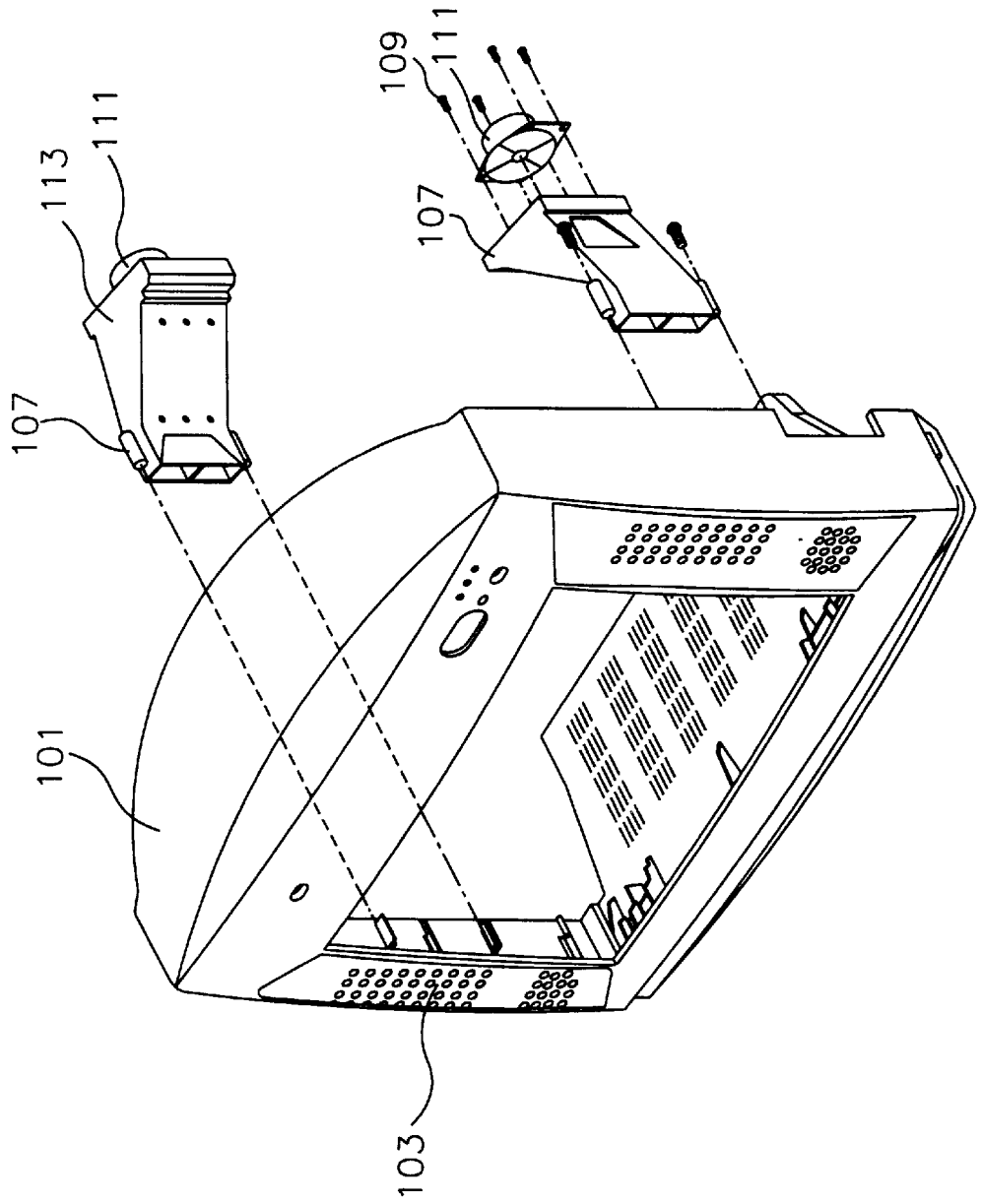
FIG. 1 is a schematic exploded perspective view of television having the conventional speaker mounting structure.
Figure 2:
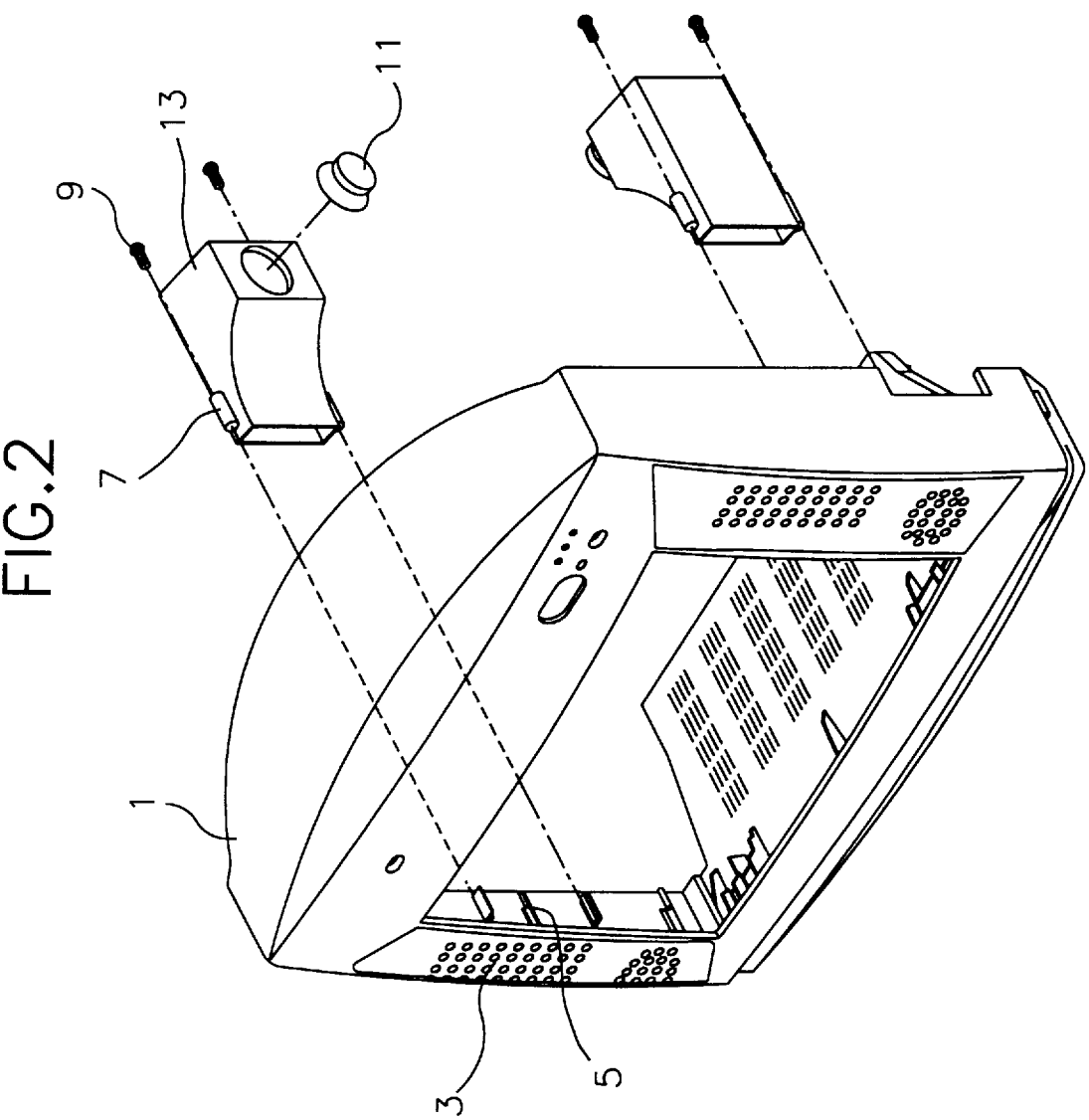
FIG. 2 is a schematic exploded perspective view of television having a device for preventing vibration of speaker in accordance with the present invention.

FIG. 2 is a schematic exploded perspective view of television having a device for preventing vibration of speaker in accordance with the present invention. As shown in this drawing, a television having a device for preventing vibration of speaker in accordance with the present invention has a cabinet 1 to accommodate a television body(not shown). The cabinet 1 has a center opening portion which a screen of a cathode-ray tube(not shown) composing the television body is exposed forward and a plurality of grills 3 are formed on a front portion of the cabinet 1 so that the sound is emitted outside. A plurality of ribs 5 protrude inward on an inner wall of the cabinet 1 so that each kind of device is supported by the rib 5 to be mounted on the cabinet 1. Particularly, the device for preventing vibration of speaker is mounted on the right/left edges of an inner wall of the cabinet 1.

Figure 3:
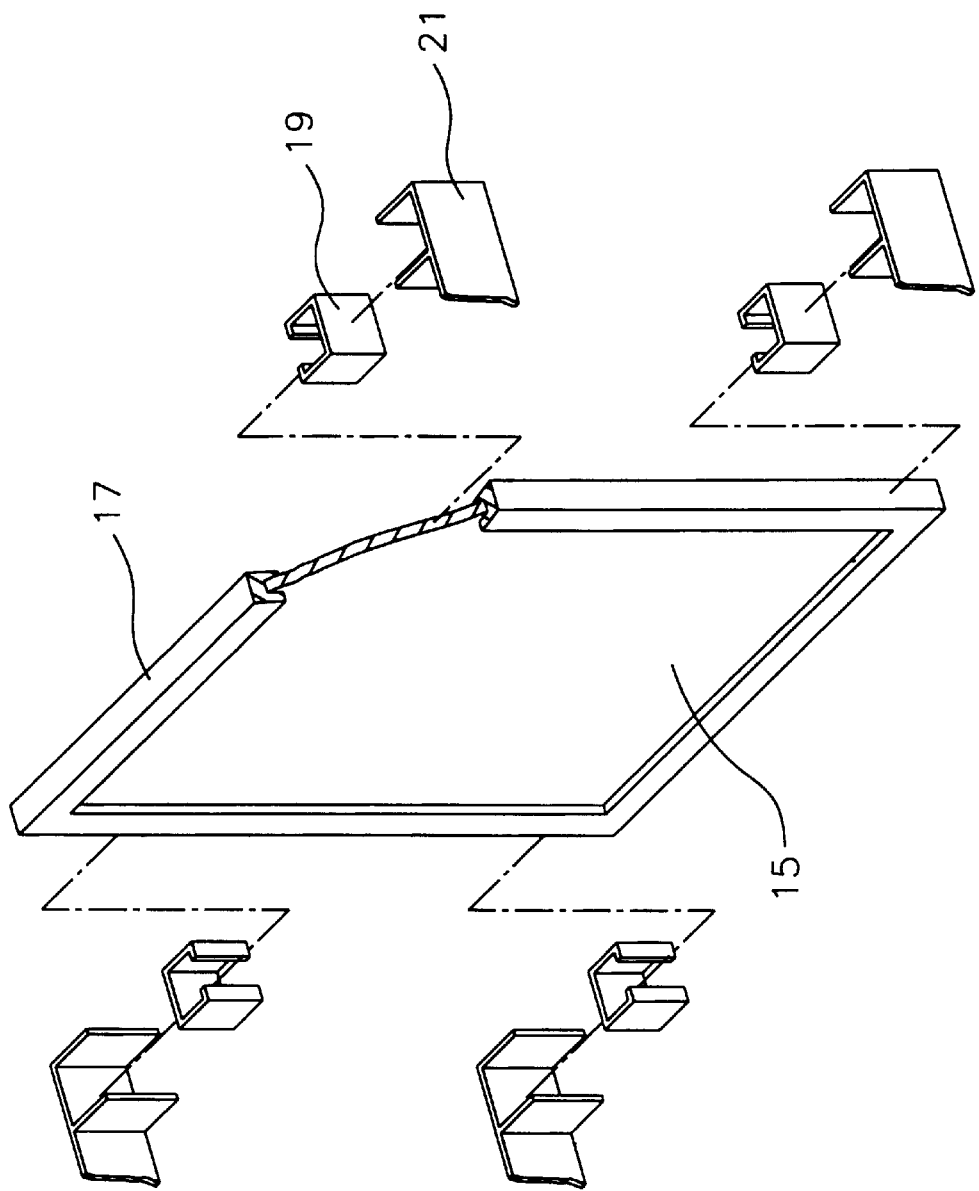
FIG. 3 is an enlarged view of a device for preventing vibration of speaker in FIG. 2.
Figure 4:
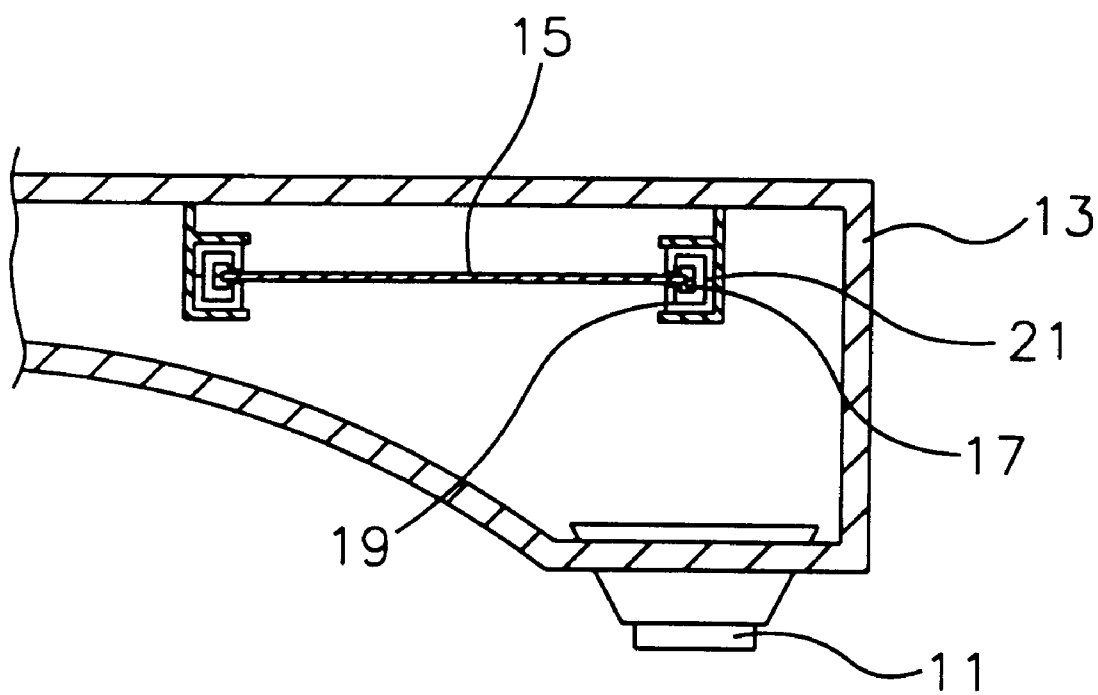
FIG. 4 is a sectional view of a device for preventing vibration of speaker.

The device for preventing vibration of speaker, as shown in FIG. 3 and FIG. 4, comprises a speaker 11 which is a woofer which generates low bandwidth sound, two enclosures 13 in which the speaker 11 is fixed on one wall toward a hollow portion formed therein and in which an opening for emitting sound and being connected to the grill 3 formed on front portion of television is formed on the other wall, a vibration plate 15 which faces the speaker 11 to be positioned in the opening in a predetermined interval from the speaker 11, and a mounting means for mounting the vibration plate 15 on the enclosure 13.

Bosses 7 are formed on upper/lower portions of each enclosure 13 so that screws 9 are affixed to the bosses 7, thereby the enclosure 13 is fixed on inner wall of cabinet 1. The mounting hole is formed on one wall of the enclosure 13 for mounting the speaker 11, and a plane which the speaker 11 is mounted on is perpendicular with a plane which the opening is formed on.

Figure 5:
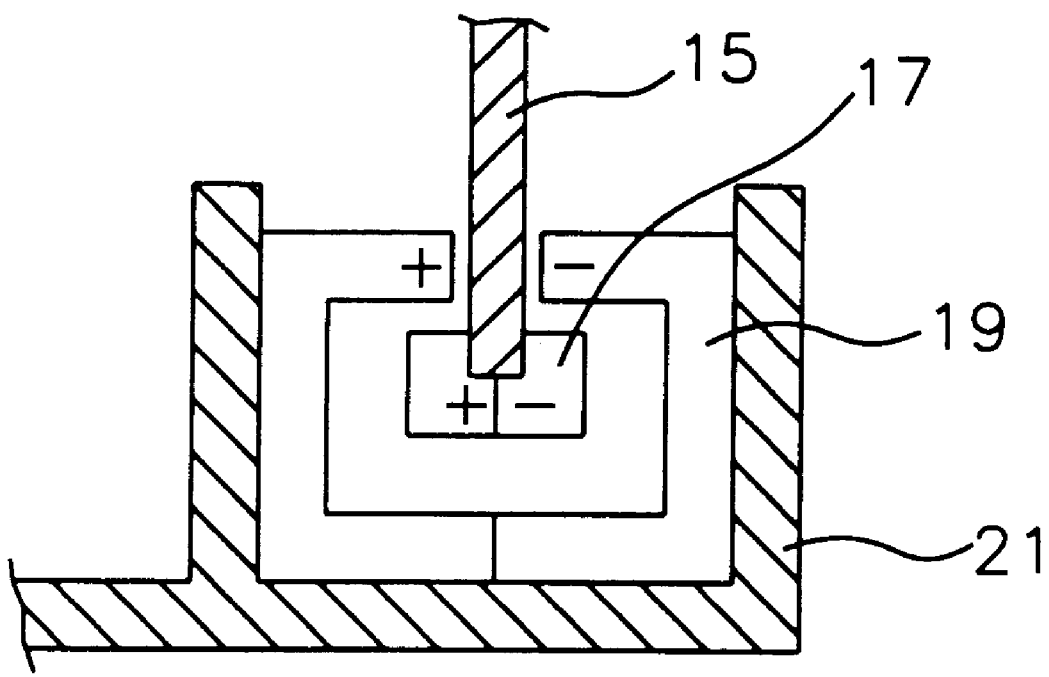
FIG. 5 is an enlarged view of portion of supporting magnet.

The mounting means is composed of a vibration magnet 17 installed on an edge of the vibration plate 15, four supporting magnets 19 for supporting one portion of the vibration magnet 17, and four supporting brackets 21 for fixing each supporting magnet 19 in the enclosure 19. The supporting magnet 19 has a C-shaped sectional plane for containing the vibration magnet 17. The supporting magnet 19 can have polarities facing polarities of the vibration magnet 17 so that pushing force is activated mutually between the supporting magnet 19 and the vibration magnet 17. As shown in FIG. 5, the vibration magnet 17 has positive polarity and negative polarity respectively on both sides of a center criterion of the vibration plate 15, and the supporting magnet 19 also has positive polarity and negative polarity respectively on both sides of a center criterion of vibration plate 15, so that pushing force is activated between the supporting magnet 19 and the vibration magnet 17 mutually.

In the above structure, when the television is set up, the first the supporting magnet 19 is fixed on inner wall of the enclosure 13 by the supporting bracket 21. And, one portion of the vibration magnet 17 is accommodated to the supporting magnet 19 so that the vibration plate 15 is installed on an inner wall of the enclosure 13. At this time, because pushing force is activated between the vibration magnet 17 and the supporting magnet 19, the vibration magnet 17 floats without touching the supporting magnet 19 untouchably. And, because thickness of the vibration magnet 17 mounted on the supporting magnet 17 is larger than width of opening of the C-shaped supporting magnet 19, the vibration plate 15 which the vibration magnet 17 is installed at the edge of is not easily detached from the supporting magnet 19. The speaker 11 is installed at the mounting hole of the enclosure 13 toward a hollow portion of the enclosure 13 to face the vibration plate 15, so that the device for preventing vibration of the speaker is completed.

The enclosure 13 is supported by the rib 5 and screws 9 is affixed through the bosses 7 of the enclosure 13, and the completed device for preventing vibration of the speaker is fixed in the cabinet 1.

Hereinbelow, the operation and the effect of the television having a device for preventing vibration of speaker in accordance with the present invention is described.

As described above in the completed television, sound emitted from the speaker 11 toward a hollow portion of the enclosure 13 strikes the vibration plate 15 first. At this time, when the vibration plate vibrates, sound from the speaker 11 is transformed into medium/low bandwidth sound. After being transformed the medium/low bandwidth sound travels in the hollow portion of the enclosure 13, the sound is emitted from the television through the opening of the enclosure 13 and grills 3 of the cabinet 1. Because the vibration plate 15 which the sound strikes is always positioned at a predetermined interval while floating due to a pushing force between the vibration magnet 17 and the supporting magnet 19, vibration of the enclosure 13 itself by the sound is prevented. Also, vibration transmitted to the cabinet 1 is also prevented, so that abnormal noise does not occur. Therefore, quality of sound of television is improved, and sound having high power is emitted outside.

As described above, by television having a device for preventing vibration of speaker, vibration of speaker emitting medium/low bandwidth sound outside and vibration of cabinet which the speaker is mounted on is minimized so that quality of sound becomes high and sound having high power is emitted outside.

In the above, the present invention is described in detail by using the preferred embodiment, but the invention is not limited to the above embodiment. It should be obvious to people skilled in the conventional art that modifications can be made to the invention as described above without departing from the spirit or the scope of the invention. However the invention is limited by the accompanying claims as below.

What is claimed is:

1. A television having a device for preventing vibration of speaker comprising:
   a speaker;
   an enclosure which the speaker is fixed on one wall toward a hollow portion formed therein and which an opening for emitting sound is formed on;
   a vibration plate which faces the speaker to be positioned in the opening in a predetermined interval from the speaker;
   a mounting means for mounting the vibration plate on the enclosure, wherein the mounting means comprises,;
   a vibration magnet installed on an edge of the vibration plate,;
   a supporting magnet for supporting one portion of the vibration magnet; and
   a supporting bracket for fixing the supporting magnet in the enclosure.

2. The television having a device for preventing vibration of speaker as claimed in claim 1, wherein the speaker is a woofer which generates low bandwidth sound.

3. The television having a device for preventing vibration of speaker as claimed in claim 1, wherein the opening of the enclosure is connected to a grill formed on a front portion of the television.

4. The television having a device for preventing vibration of speaker as claimed in claim 3, wherein a plane which the speaker is mounted on is perpendicular with a plane which the opening is formed on.

5. The television having a device for preventing vibration of speaker as claimed in claim 1, wherein the vibration plate is quadrangular-shaped.

6. The television having a device for preventing vibration of speaker as claimed in claim 1, wherein the supporting magnet has a C-shaped sectional plane for containing the vibration magnet.

7. The television having a device for preventing vibration of speaker as claimed in claim 6, wherein the supporting magnet has polarities facing polarities of the vibration magnet so that a pushing force is activated mutually between the supporting magnet and the vibration magnet.

8. The television having a device for preventing vibration of speaker as claimed in claim 6, wherein the supporting magnet is installed at four positions around the vibration plate.

* * * * *